(12) United States Patent
Nakahira et al.

(10) Patent No.: US 12,156,053 B2
(45) Date of Patent: Nov. 26, 2024

(54) WIRELESS PERFORMANCE EVALUATION METHOD AND WIRELESS PERFORMANCE EVALUATION SYSTEM

(71) Applicant: NIPPON TELEGRAPH AND TELEPHONE CORPORATION, Tokyo (JP)

(72) Inventors: Toshiro Nakahira, Musashino (JP); Shoko Shinohara, Musashino (JP); Hirantha Abeysekera, Musashino (JP); Yasuhiko Inoue, Musashino (JP); Koichi Ishihara, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 350 days.

(21) Appl. No.: 17/600,555

(22) PCT Filed: Mar. 24, 2020

(86) PCT No.: PCT/JP2020/013138
§ 371 (c)(1),
(2) Date: Sep. 30, 2021

(87) PCT Pub. No.: WO2020/203501
PCT Pub. Date: Oct. 8, 2020

(65) Prior Publication Data
US 2022/0174516 A1 Jun. 2, 2022

(30) Foreign Application Priority Data
Apr. 2, 2019 (JP) ................................. 2019-070928

(51) Int. Cl.
*H04W 24/06* (2009.01)

(52) U.S. Cl.
CPC .................................. *H04W 24/06* (2013.01)

(58) Field of Classification Search
CPC .............................. H04W 24/06; H04W 16/22
(Continued)

(56) References Cited

U.S. PATENT DOCUMENTS 6,308,072 B1 10/2001 Labedz et al.
2004/0229604 A1* 11/2004 Fong ..................... H04W 72/21
455/422.1
(Continued)

FOREIGN PATENT DOCUMENTS

JP H064508 A 1/1994
JP H11509074 A 8/1999
WO WO-2009075282 A1 6/2009

OTHER PUBLICATIONS

The 802.11 Working Group of the LAN/MAN Standards Committee of the IEEE Computer Society, Part 11: Wireless LAN Medium Access Control (MAC) and Physical Layer (PHY) Specifications, IEEE Std 802.11-2016,IEEE Standard for Information technology-Telecommunications and information exchange between systems Local and metropolitan area networks-Specific requirements, Dec. 2016.

*Primary Examiner* — Fabricio R Murillo Garcia
(74) *Attorney, Agent, or Firm* — Harness, Dickey & Pierce, P.L.C.

(57) ABSTRACT

A wireless performance evaluation method for performing wireless performance evaluation of a wireless network including wireless base stations and wireless terminal stations includes: before performing wireless performance evaluation operation based on wireless performance evaluation information generated from wireless performance evaluation conditions, determining whether an existing wireless performance evaluation result of wireless performance evaluation operation that has been performed is (Continued)

substitutable or not; and if the existing wireless performance evaluation result is substitutable, skipping arithmetic processing corresponding to the wireless performance evaluation information and substituting the existing wireless performance evaluation result.

2 Claims, 6 Drawing Sheets

(58) Field of Classification Search
USPC .......................................................... 455/423
See application file for complete search history.

(56) References Cited

U.S. PATENT DOCUMENTS

| | | | |
|---|---|---|---|
| 2005/0141467 A1* | 6/2005 | Pan | H04W 24/06 370/338 |
| 2005/0180362 A1* | 8/2005 | Chin | H04W 74/0833 370/335 |
| 2007/0274256 A1* | 11/2007 | Murai | H04W 72/542 370/328 |
| 2010/0267343 A1 | 10/2010 | Nyu | |
| 2011/0249573 A1* | 10/2011 | Hottinen | H04W 84/20 370/252 |

* cited by examiner

Fig. 2

| CONDITION NUMBER | | 1 | | ... | 2 | ... | ... |
|---|---|---|---|---|---|---|---|
| WIRELESS BASE STATION INFORMATION | WIRELESS BASE STATION NUMBER | 1 | 2 | ... | 1 | ... | ... |
| | WIRELESS BASE STATION POSITION | COORDINATES A | COORDINATES B | ... | COORDINATES A | ... | ... |
| | WIRELESS BASE STATION PARAMETERS | TRANSMIT POWER 20 dBm CHANNEL 36/20 MHz | TRANSMIT POWER 20 dBm CHANNEL 100/20 MHz | ... | TRANSMIT POWER 20 dBm CHANNEL 36/40 MHz | ... | ... |
| | ⋮ | ⋮ | ⋮ | ... | ⋮ | ... | ... |
| WIRELESS TERMINAL STATION INFORMATION | WIRELESS TERMINAL STATION NUMBER | 1 0 1 | 1 0 2 | ... | 1 0 1 | ... | ... |
| | WIRELESS TERMINAL STATION POSITION | COORDINATES a | COORDINATES b | ... | COORDINATES a | ... | ... |
| | CONNECTION DESTINATION WIRELESS BASE STATION NUMBER | 1 | 2 | ... | 1 | ... | ... |
| | ⋮ | ⋮ | ⋮ | ⋮ | ... | ⋮ | ... | ... |
| WIRELESS TRAFFIC INFORMATION | TRAFFIC TYPE/SPEED | DOWNSTREAM TCP 100 Mbps | DOWNSTREAM TCP 100 Mbps | ... | DOWNSTREAM TCP 100 Mbps | ... | ... |
| | ⋮ | ⋮ | ⋮ | ⋮ | | ⋮ | ⋮ | ⋮ |

Fig. 3

| CONDITION NUMBER | | 1 | | | | | | |
|---|---|---|---|---|---|---|---|---|
| EVALUATION NUMBER | | 1 | | ... | 2 | ... | ... | |
| EVALUATED WIRELESS BASE STATION INFORMATION | WIRELESS BASE STATION NUMBER | 1 | 1 | ... | 2 | ... | ... | ... |
| | WIRELESS BASE STATION POSITION | COORDINATES A | COORDINATES A | ... | COORDINATES B | ... | ... | ... |
| | WIRELESS BASE STATION PARAMETERS | TRANSMIT POWER 20 dBm CHANNEL 36/20 MHz | TRANSMIT POWER 20 dBm CHANNEL 36/20 MHz | ... | TRANSMIT POWER 20 dBm CHANNEL 100/40 MHz | ... | ... | ... |
| | ⋮ | ⋮ | ⋮ | ... | ⋮ | ... | ... | ... |
| EVALUATED WIRELESS TERMINAL STATION INFORMATION | WIRELESS TERMINAL STATION NUMBER | 1 0 1 | 1 0 2 | ... | 1 0 3 | ... | ... | ... |
| | WIRELESS TERMINAL STATION POSITION | COORDINATES a | COORDINATES b | ... | COORDINATES c | ... | ... | ... |
| | CONNECTION DESTINATION WIRELESS BASE STATION NUMBER | 1 | 1 | ... | 2 | ... | ... | ... |
| | ⋮ | ⋮ | ⋮ | ... | ⋮ | ... | ... | ... |
| EVALUATED WIRELESS TRAFFIC INFORMATION | TRAFFIC TYPE/SPEED | DOWNSTREAM TCP 100 Mbps | DOWNSTREAM TCP 100 Mbps | ... | DOWNSTREAM TCP 100 Mbps | ... | ... | ... |
| | ⋮ | ⋮ | ⋮ | ... | ⋮ | ⋮ | ⋮ | ⋮ |
| INTERFERING WIRELESS BASE STATION INFORMATION | WIRELESS BASE STATION NUMBER | 3 | 3 | ... | 4 | ... | ... | ... |
| | WIRELESS BASE STATION POSITION | COORDINATES C | COORDINATES C | ... | COORDINATES D | ... | ... | ... |
| | WIRELESS BASE STATION PARAMETERS | TRANSMIT POWER 20 dBm CHANNEL 36/20 MHz | TRANSMIT POWER 20 dBm CHANNEL 36/20 MHz | ... | TRANSMIT POWER 20 dBm CHANNEL 36/40 MHz | ... | ... | ... |
| | ⋮ | ⋮ | ⋮ | ... | ⋮ | ... | ... | ... |
| INTERFERING WIRELESS TERMINAL STATION INFORMATION | WIRELESS TERMINAL STATION NUMBER | 1 0 4 | 1 0 4 | ... | 1 0 5 | ... | ... | ... |
| | WIRELESS TERMINAL STATION POSITION | COORDINATES d | COORDINATES d | ... | COORDINATES e | ... | ... | ... |
| | CONNECTION DESTINATION WIRELESS BASE STATION NUMBER | 3 | 3 | ... | 4 | ... | ... | ... |
| | ⋮ | ⋮ | ⋮ | ... | ⋮ | ... | ... | ... |
| INTERFERING WIRELESS TRAFFIC INFORMATION | TRAFFIC TYPE/SPEED | DOWNSTREAM TCP 100 Mbps | DOWNSTREAM TCP 100 Mbps | ... | DOWNSTREAM TCP 100 Mbps | ... | ... | ... |
| | ⋮ | ⋮ | ⋮ | ... | ⋮ | ⋮ | ⋮ | ⋮ |

WIRELESS PERFORMANCE EVALUATION METHOD AND WIRELESS PERFORMANCE EVALUATION SYSTEM

CROSS-REFERENCE TO RELATED APPLICATIONS

This application is a 371 U.S. National Phase of International Application No. PCT/JP2020/013138 filed on Mar. 24, 2020, which claims priority to Japanese Application No. 2019-070928 filed on Apr. 2, 2019. The entire disclosures of the above applications are incorporated herein by reference.

TECHNICAL FIELD

The present invention relates to a wireless performance evaluation method and a wireless performance evaluation system for performing wireless performance evaluation of a wireless network.

BACKGROUND ART

Recently, with the rapid spread of wireless terminals including smartphones and tablets, users using large-capacity content by wireless terminals have been increasing, and the amount of traffic on a wireless network has been rapidly increasing. In order to easily accommodate wireless traffic at a low cost, the wireless LAN standard of IEEE802.11 shown in Non-Patent Literature 1, which is widely spread for a high-speed wireless access system using radio waves of unlicensed bands not requiring the wireless system license, is often used. In various areas such as private areas including homes and offices and public areas including stores, stations and airports, wireless LAN networks are provided.

In a wireless LAN network, the number of users that can be accommodated for one wireless LAN base station is limited. Therefore, in such an area a lot of users are crowded, a plurality of wireless LAN base stations may be installed in order to disperse and accommodate the users. However, when the number of installed wireless LAN base stations increases, equipment and installation costs increase. Therefore, prior evaluation is performed as to which level of communication speed can be secured per user when a wireless LAN base station is installed in the area. For example, it is conceivable to temporarily construct an assumed number of wireless LAN base stations that are to be installed, at assumed installation places, connect the wireless LAN terminal stations and measure throughput.

However, since evaluation by actual measurement requires time and effort for temporary construction, measurement and removal, and operation, it cannot be easily performed. Therefore, as a method for performing evaluation with less time and effort, it is conceivable to use a computer simulator. Though it is necessary to consider a difference between evaluation results of actual measurement and by the computer simulator, evaluations can be performed for various wireless LAN base station installation patterns and numbers of installations.

CITATION LIST

Non-Patent Literature

Non-Patent Literature 1: IEEE Std 802.11-2016, December 2016.

SUMMARY OF THE INVENTION

Technical Problem

In a computer simulator for performing performance evaluation of a wireless network, the amount of arithmetic operation increases according to evaluation patterns and the number of evaluation points, and it takes much time to obtain an evaluation result. For example, in the case of evaluating throughput at eight positions in three evaluation patterns, it is necessary to make 3×8=24 evaluations. Though it becomes easy to make evaluations in various evaluation patterns and various evaluation points by using a computer simulator, it is a problem that calculation time therefor increases.

An object of the present invention is to provide a wireless performance evaluation method and a wireless performance evaluation system capable of efficiently performing wireless performance evaluation of a wireless network.

Means for Solving the Problem

A first invention is a wireless performance evaluation method for performing wireless performance evaluation of a wireless network including wireless base stations and wireless terminal stations, the wireless performance evaluation method including: a step 1 of, before performing wireless performance evaluation operation based on wireless performance evaluation information generated from wireless performance evaluation conditions, determining whether an existing wireless performance evaluation result of wireless performance evaluation operation that has been performed is substitutable or not; and a step 2 of, if the existing wireless performance evaluation result is substitutable, skipping arithmetic processing corresponding to the wireless performance evaluation information and substituting the existing wireless performance evaluation result.

In the wireless performance evaluation method of the first invention, the step 1 may determine that the existing wireless performance evaluation result is substitutable if various kinds of pieces of information included in the wireless performance evaluation information correspond to those corresponding to the existing wireless performance evaluation result or if a difference is such a difference that a result equal to the existing wireless performance evaluation result is obtained. Further, the step 1 may determine that the result equal to the existing wireless performance evaluation result is obtained if, among the various kinds of pieces of information included in the wireless performance evaluation information, an interference signal level is equal to or above a predetermined threshold, or a receive power value is equal to or above a predetermined threshold, or an error rate is equal to or below a predetermined threshold.

A second invention is a wireless performance evaluation system performing wireless performance evaluation of a wireless network including wireless base stations and wireless terminal stations, the wireless performance evaluation system including: substitution possibility/impossibility determination means for, before performing wireless performance evaluation operation based on wireless performance evaluation information generated from wireless performance evaluation conditions, determining whether an existing wireless performance evaluation result of wireless performance evaluation operation that has been performed is substitutable or not; and substitution means for, if the existing wireless performance evaluation result is substitutable, skipping arithmetic processing corresponding to the wireless performance evaluation information and substituting the existing wireless performance evaluation result.

In the wireless performance evaluation system of the second invention, the substitution possibility/impossibility determination means may determine that the existing wireless performance evaluation result is substitutable if various kinds of pieces of information included in the wireless performance evaluation information correspond to those corresponding to the existing wireless performance evaluation result or if a difference is such a difference that a result equal to the existing wireless performance evaluation result is obtained. Further, the substitution possibility/impossibility determination means may determine that the result equal to the existing wireless performance evaluation result is obtained if, among the various kinds of pieces of information included in the wireless performance evaluation information, an interference signal level is equal to or above a predetermined threshold, or a receive power value is equal to or above a predetermined threshold, or an error rate is equal to or below a predetermined threshold.

Effects of the Invention

According to the present invention, at the time of performing wireless performance evaluation of a wireless network using a computer simulator, it is sequentially determined whether an existing wireless performance evaluation result of wireless performance evaluation that has been performed is substitutable or not. If the existing wireless performance evaluation result is substitutable, arithmetic processing under the conditions thereof is skipped, and the existing wireless performance evaluation result is substituted. Thereby, it is possible to reduce calculation time required for the wireless performance evaluation of the wireless network and efficiently obtain a wireless performance evaluation result.

BRIEF DESCRIPTION OF DRAWINGS

FIG. 2 is a diagram showing an example of wireless performance evaluation conditions.

FIG. 3 is a diagram showing an example of wireless performance evaluation information.

DESCRIPTION OF EMBODIMENTS

Figure 1:
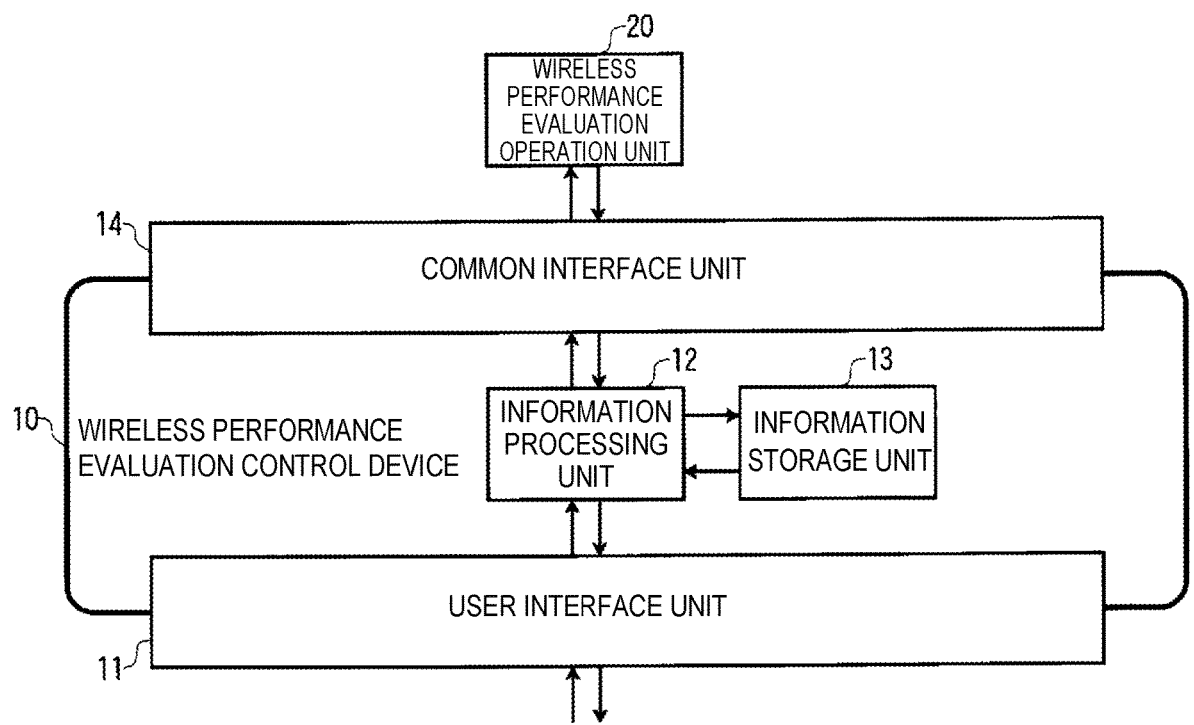
FIG. 1 is a diagram showing a configuration example of a wireless performance evaluation system in the present invention.

FIG. 1 shows a configuration example of a wireless performance evaluation system in the present invention.

In FIG. 1, the wireless performance evaluation system is configured with a wireless performance evaluation control device 10 and a wireless performance evaluation operation unit 20. They may be configured with software. The wireless performance evaluation control device 10 is provided with a user interface unit 11, an information processing unit 12, an information storage unit 13 and a common interface unit 14.

The user interface unit 11 inputs wireless performance evaluation conditions set by a user, outputs them to the information processing unit 12, and outputs a wireless performance evaluation result processed by the information processing unit 12 to the user.

The information processing unit 12 has four functions of an information generation function, an information input/output function, an information storage/read-out function and a wireless performance evaluation function. In the information generation function, wireless performance evaluation information used for wireless performance evaluation in the wireless performance evaluation operation unit 20 is generated from the wireless performance evaluation conditions set by the user. In the information input/output function, the wireless performance evaluation conditions are acquired from the user via the user interface unit 11, and outputs the wireless performance evaluation information to the wireless performance evaluation operation unit 20 via the common interface unit 14. Further, in the information input/output function, the wireless performance evaluation result is acquired from the wireless performance evaluation operation unit 20, and outputs the wireless performance evaluation result to the user via the user interface unit 11. In the information storage/read-out function, information is outputted and recorded to the information storage unit 13, and reads out the information from the information storage unit 13.

In the wireless performance evaluation function which is a feature of the present invention, it is determined whether a wireless performance evaluation result corresponding to the wireless performance evaluation information has been recorded to the information storage unit 13 or not. The wireless performance evaluation function outputs the wireless performance evaluation information to the wireless performance evaluation operation unit 20 if there is not corresponding information; and, if corresponding information exists, acquires the corresponding wireless performance evaluation result from the information storage unit 13 and substitutes the corresponding wireless performance evaluation result.

The information storage unit 13 records information inputted from the information processing unit 12, and outputs the recorded information based on an instruction from the information processing unit 12.

The common interface unit 14 performs information format mutual conversion for mutually exchanging information between the information processing unit 12 and the wireless performance evaluation operation unit 20, and the like.

The wireless performance evaluation operation unit 20 inputs the wireless performance evaluation information from the common interface unit 14, performs arithmetic operation for wireless performance evaluation, and outputs an obtained wireless performance evaluation result to the common interface unit 14.

Here, an example of the wireless performance evaluation conditions is shown in FIG. 2. As shown in FIG. 2, the wireless performance evaluation conditions show conditions at the time of performing wireless performance evaluation, and include condition numbers, wireless base station information, wireless terminal station information and wireless traffic information. The wireless base station information includes information about wireless base stations, and includes wireless base station numbers, wireless base station positions (coordinates), wireless base station parameters and the like. The wireless terminal station information includes information about wireless terminal stations, and includes wireless terminal station numbers, wireless terminal station positions (coordinates), wireless terminal station parameters and the like. The wireless traffic information includes information about wireless traffic, and includes traffic types/speeds.

An example of the wireless performance evaluation information is shown in FIG. 3. As shown in FIG. 3, the wireless performance evaluation information shows evaluation content at the time of performing wireless performance evaluation, and includes condition numbers, evaluation numbers, evaluated wireless base station information, evaluated wireless terminal station information, evaluated wireless traffic information, interfering wireless base station information, interfering wireless terminal station information and interfering wireless traffic information. The condition numbers are the same as the condition numbers in the wireless performance evaluation conditions of FIG. 2. The evaluation numbers are numbers for evaluation processes, respectively, and one or more evaluation numbers are included in one condition number. The evaluated wireless base station information, the evaluated wireless terminal station information and the evaluated wireless traffic information are pieces of information about evaluation target wireless base stations, wireless terminal stations and wireless traffics, respectively, and information items are similar to those of the wireless base station information, the wireless terminal station information and the wireless traffic information included in the wireless performance evaluation conditions of FIG. 2, respectively. The interfering wireless base station information, the interfering wireless terminal station information and the interfering wireless traffic information are pieces of information about wireless base stations, wireless terminal stations and wireless traffics other than the evaluation targets, respectively, and information items are similar to those of the wireless base station information, the wireless terminal station information and the wireless traffic information included in the wireless performance evaluation conditions of FIG. 2, respectively.

Figure 4:
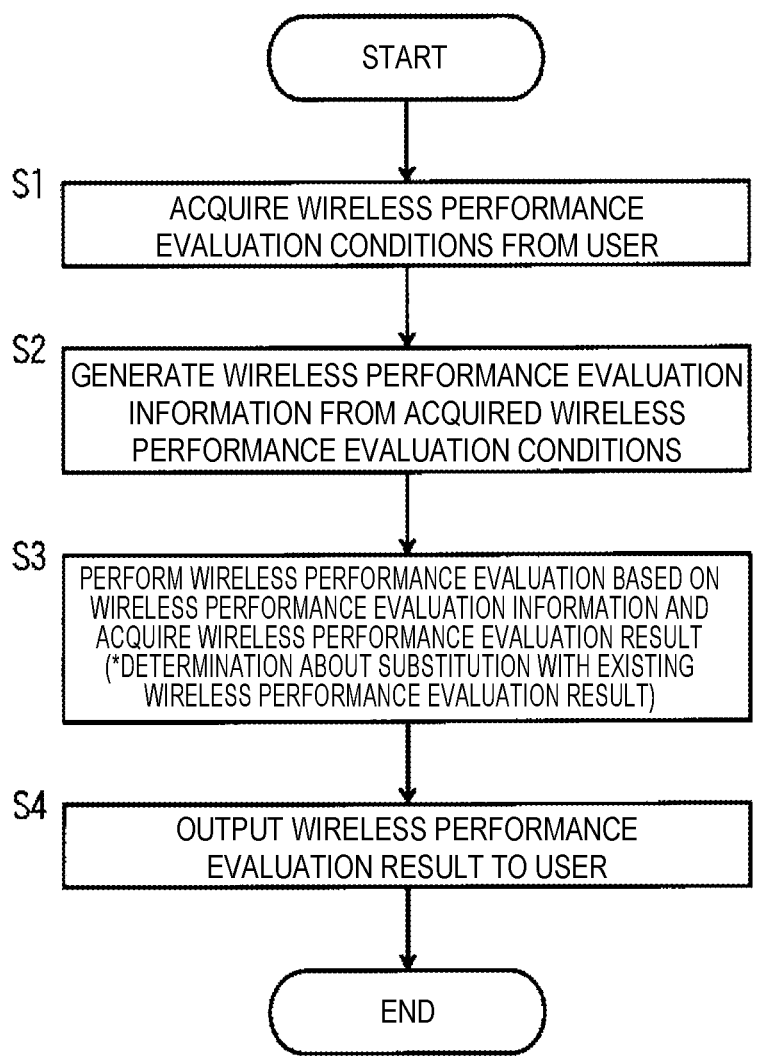
FIG. 4 is a flowchart showing an example of a process procedure of a wireless performance evaluation control device 10.

FIG. 4 shows an example of a process procedure of the wireless performance evaluation control device 10.

In FIG. 4, wireless performance evaluation conditions are acquired from a user first (step S1).

Next, wireless performance evaluation information used for wireless performance evaluation in the wireless performance evaluation operation unit 20 is generated from the acquired wireless performance evaluation conditions (step S2). Note that, as a method for generating the wireless performance evaluation information, one wireless base station targeted by wireless performance evaluation is selected from the wireless performance evaluation conditions and set as an evaluated wireless base station; furthermore, a wireless terminal station wirelessly connected to the evaluated wireless base station is set as an evaluated wireless terminal station; and a wireless base station and a wireless terminal station existing in the same area as the evaluated wireless base station and using the same wireless frequency channel are set as an interfering wireless base station and an interfering wireless terminal station, respectively. By repeating this for all evaluation target wireless base stations, the wireless performance evaluation information is generated.

Next, wireless performance evaluation is performed based on the wireless performance evaluation information, and a wireless performance evaluation result is acquired (step S3). Here, determination about substitution with existing wireless performance evaluation result, which is a feature of the present invention, is performed. Details thereof will be separately described with reference to FIGS. 5 and 6.

Lastly, the acquired wireless performance evaluation result is outputted to the user (step S4).

Figure 5:
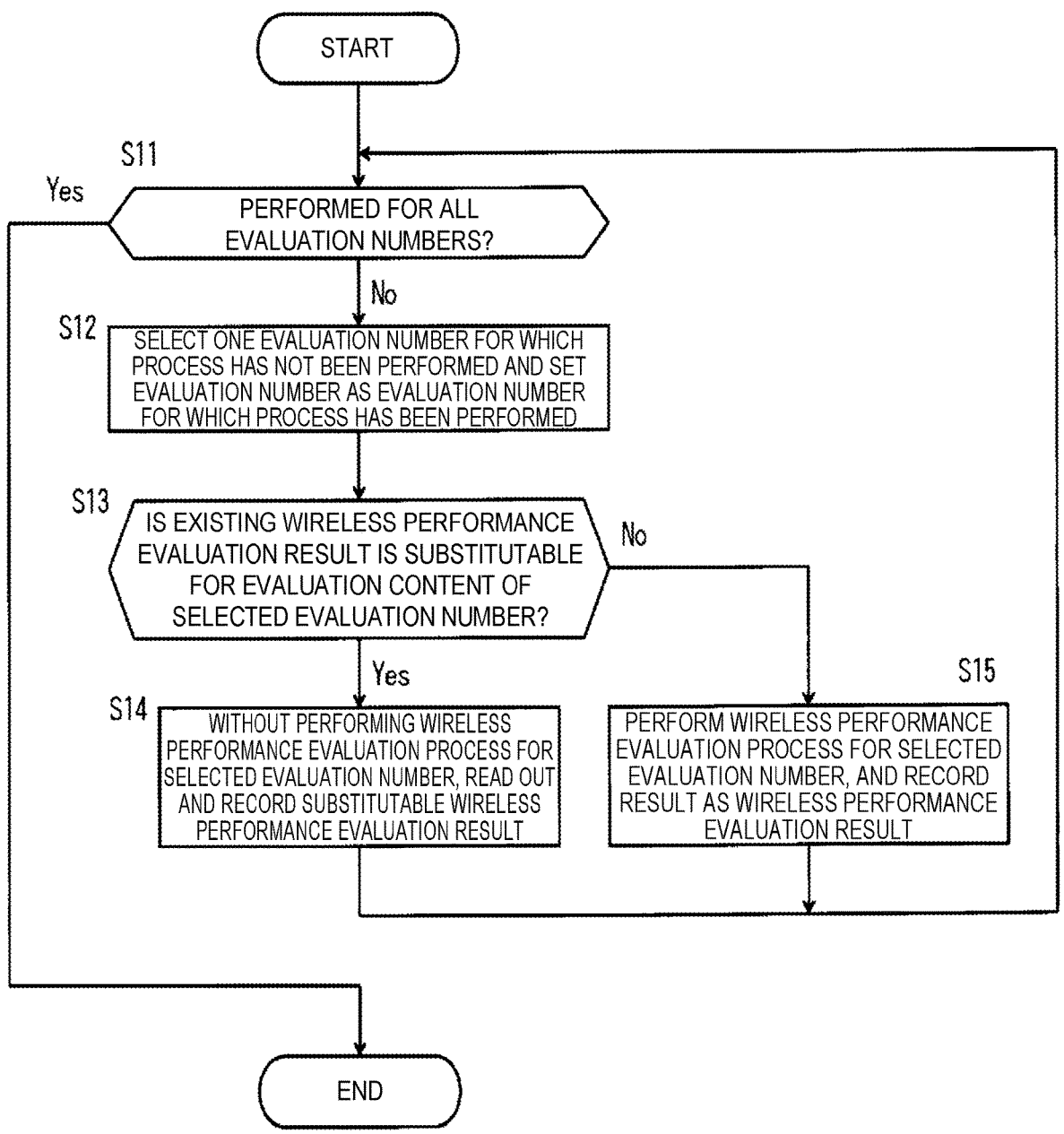
FIG. 5 is a flowchart showing an example of a process procedure for wireless performance evaluation of step S3.

FIG. 5 shows an example of a process procedure for wireless performance evaluation of step S3.

In FIG. 5, it is determined whether the wireless performance evaluation process for all the evaluation numbers in the wireless performance evaluation information has been performed or not (step S11). If the process has been performed (step S11: Yes), the process is ended. If the process has not been performed (step S11: No), one evaluation number for which the process has not been performed is selected and set as an evaluation number for which the process has been performed (step S12).

Figure 6:
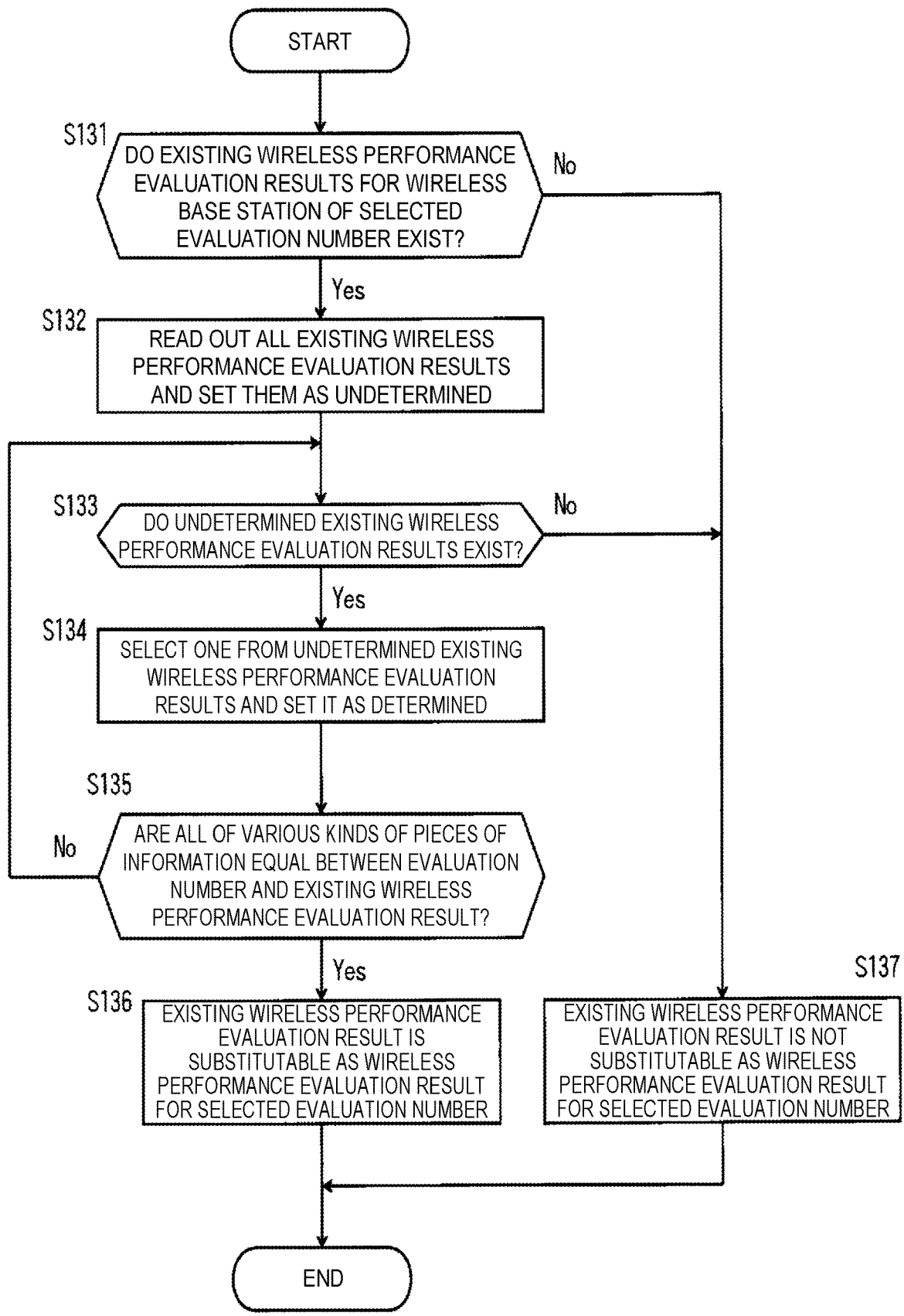
FIG. 6 is a flowchart showing an example of a process procedure for determination about substitution with existing wireless performance evaluation result of step S13.

Next, it is determined whether an existing wireless performance evaluation result is substitutable for evaluation content of the selected evaluation number or not (step S13; a procedure for the determination is shown in FIG. 6). If substitution is possible (step S13: Yes), the wireless performance evaluation process for the selected evaluation number is not performed, and the substitutable wireless performance evaluation result is read out from the information storage unit 13 and recorded (step S14). On the other hand, if substitution is impossible (step S13: No), the wireless performance evaluation process for the selected evaluation number is performed, and a result is recorded as a wireless performance evaluation result (step S15). The above process is repeated until the process has been performed for all the evaluation numbers.

FIG. 6 shows an example of a process procedure for the determination about substitution with the existing wireless performance evaluation result of step S13.

In FIG. 6, it is determined whether existing wireless performance evaluation results for a wireless base station of the evaluation number selected at step S12 exist or not (step S131). If they exist (step S131: Yes), all the existing wireless performance evaluation results are read out and set as undetermined (step S132).

Next, in the following determination loop process, it is determined whether undetermined existing wireless performance evaluation results exist or not (step S133). If they exist (step S133: Yes), one is selected from the undetermined existing wireless performance evaluation results and set as determined (step S134).

Next, it is determined, between the evaluation number and the existing wireless performance evaluation result, all of various kinds of pieces of information included in the wireless performance evaluation result are equal or not (step S135). Here, in the example shown in FIG. 3, the various kinds of pieces of information refers to the wireless base station information, the wireless terminal station information, the wireless traffic information, the interfering wireless base station information, the interfering wireless terminal station information and the interfering wireless traffic information. If all of the various kinds of pieces of information are equal between the evaluation number and the existing wireless performance evaluation result (step S135: Yes), it is determined that the selected existing wireless performance evaluation result is substitutable as a wireless performance evaluation result for the selected evaluation number (step S136), and the process is ended. On the other hand, if there is unequal information among the various kinds of pieces of information (step S135: No), the flow returns to step S133.

Note that, here, being equal is not limited only to the case where the pieces of information correspond but a case where conditions can be regarded as the same in performing wireless performance evaluation is also included. In other words, a case where, even though receive power values or interference power values are different, the difference is such a difference that the same result can be obtained in wireless performance evaluation, a case where, even though different wireless channels are used, other pieces of information are the same, and, consequently, the various kinds of pieces of information can be regarded as equal, and the like are included.

For example, in the case of performing access control by CSMA/CA, interference is avoided, by stopping communication if an interference signal is detected at a level equal to or above a threshold (for example, −82 dBm). Therefore, if interference signal levels are equal to or above a threshold, wireless performance evaluation results are regarded as equal. Further, required receive power is specified for each transmission rate (MCS) in stages. Therefore, if there is receive power equal to or above a threshold, transmission speed does not increase any more. Therefore, if receive power values are equal to or above a threshold, wireless performance evaluation results are regarded as equal. Further, if packet error rates (retransmission rates) are equal to or below a threshold, for example, error rates of 0.1% and 0.01%, a difference between throughputs is 0.09%, which does not influence the throughputs almost at all. Therefore, if error rates are equal to or below the threshold, wireless performance evaluation results are regarded as equal.

On the other hand, if existing wireless performance evaluation results do not exist at step S131 or if undetermined existing wireless performance evaluation results do not exist at step S133, the flow proceeds to step S137. At step S137, it is determined that an existing wireless performance evaluation result is not substitutable as an evaluation result for the selected evaluation number, and the process is ended.

By the above process flow, if substitution with an existing wireless performance evaluation result is possible, the wireless performance evaluation operation in the wireless performance evaluation operation unit 20 can be omitted. In conventional techniques, there is not such a process, and it is necessary to comprehensively perform the wireless performance evaluation operation for all pieces of wireless performance evaluation information. However, by the present process flow, it is possible to suppress the number of implementations of the wireless performance evaluation operation to the minimum necessary, and significant reduction in arithmetic processing time becomes possible.

Another Embodiment

In the embodiment shown above, a procedure for determining whether substitution is possible or not for a wireless performance evaluation result obtained by performing evaluation in the same wireless base station before and, if substitution is possible, reusing the wireless performance evaluation result has been shown. Meanwhile, it is also possible to determine whether substitution is possible or not for a wireless performance evaluation result obtained by performing evaluation for another wireless terminal station in the same wireless base station and, if substitution is possible, reuse the wireless performance evaluation result. For example, at step S131 of FIG. 6, it is determined whether a wireless performance evaluation result is substitutable or not for each wireless terminal station. Further, at step S135, it can be determined whether or not all of the various kinds of pieces of information are the same, and pieces of communication state information about the wireless terminal stations are equal, between the evaluation number and the existing wireless performance evaluation result. Thus, though the configuration of the wireless performance evaluation information (for each wireless base station and for each wireless terminal station) and the flow of determination about substitution of existing wireless performance evaluation result are partially different, a system configuration and the like can be similarly adopted.

REFERENCE SIGNS LIST

10 Wireless performance evaluation control device
11 User interface unit
12 Information processing unit
13 Information storage unit
14 Common interface unit
20 Wireless performance evaluation operation unit

The invention claimed is:

1. A wireless performance evaluation method for performing wireless performance evaluation of a wireless network including wireless base stations and wireless terminal stations, the wireless performance evaluation method comprising:
   storing wireless performance evaluation results for select base stations in a database, where each wireless performance evaluation result includes information for one or more wireless terminals and wireless traffic information;
   receiving an evaluation scenario for the wireless network, where the evaluation scenario specifies one or more wireless base stations, one or more wireless terminals and wireless traffic information;
   for each wireless base station in the evaluation scenario, retrieving from the database all of the wireless performance evaluation results for a given wireless base station;
   for each retrieved wireless performance evaluation result for the given wireless base station, determining whether the retrieved wireless performance evaluation result is substitutable for the given wireless base station and, in response to a determination that the retrieved wireless performance evaluation result is substitutable, skipping arithmetic processing of the evaluation scenario and recording the retrieved wireless performance evaluation result as a result for the evaluation scenario; and
   in response to a determination that none of the retrieved wireless performance results are suitable for the given wireless base station, performing arithmetic processing of the evaluation scenario
   wherein the retrieved wireless performance evaluation results is substitutable when information for the one or more wireless terminals and the wireless traffic information correlate to the one or wireless terminals and the wireless traffic information of the evaluation scenario.

2. A non-transitory computer-readable medium having computer-executable instructions that, upon execution of the instructions by a processor of a computer, cause the computer to:
   store wireless performance evaluation results for select base stations in a database, where each wireless performance evaluation result includes information for one or more wireless terminals and wireless traffic information;
   receive an evaluation scenario for a wireless network, where the evaluation scenario specifies a set of wireless base stations, a set of wireless terminals and the wireless traffic information;

for each wireless base station in the evaluation scenario, retrieve from the database all of the wireless performance evaluation results for a given wireless base station;

for each retrieved wireless performance evaluation result for the given wireless base station, determine whether the retrieved wireless performance evaluation result is substitutable for the given wireless base station and, in response to a determination that the retrieved wireless performance evaluation result is substitutable, skip arithmetic processing of the evaluation scenario and record the retrieved wireless performance evaluation result as a result for the evaluation scenario; and in response to a determination that none of the retrieved wireless performance results are suitable for the given wireless base station, perform the arithmetic processing of the evaluation scenario;

wherein the retrieved wireless performance evaluation results are substitutable when information for the one or more wireless terminals and the wireless traffic information correlate to the one or more wireless terminals and the wireless traffic information of the evaluation scenario.

* * * * *